United States Patent

Sano et al.

[11] Patent Number: 6,131,046
[45] Date of Patent: *Oct. 10, 2000

[54] ALTERING DISPLAYED KEYS TO INDICATE AVAILABILITY OF SERVICE FOR A COMMUNICATIONS APPARATUS

[75] Inventors: Yutaka Sano, Ogaki; Jun Kitakado, Gifu-ken, both of Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/666,048

[22] Filed: Jun. 19, 1996

[30] Foreign Application Priority Data

| Jun. 23, 1995 | [JP] | Japan | 7-158002 |
| Nov. 9, 1995 | [JP] | Japan | 7-291214 |
| Feb. 19, 1996 | [JP] | Japan | 8-030490 |

[51] Int. Cl.⁷ .................................................. H04Q 7/20
[52] U.S. Cl. ........................ 455/566; 455/421; 455/158.4
[58] Field of Search ..................... 455/421, 566, 455/564, 158.4, 158.5, 159.1, 159.2; 345/156, 155, 150; 340/573, 825.44; 379/100.15

[56] References Cited

U.S. PATENT DOCUMENTS

| 5,049,875 | 9/1991 | DeLuca et al. | 340/825 |
| 5,140,419 | 8/1992 | Galumbeck et al. | 340/825.44 |
| 5,444,765 | 8/1995 | Marui et al. | 379/59 |
| 5,517,551 | 5/1996 | Arai | 379/58 |
| 5,552,806 | 9/1996 | Lenchik | 345/173 |
| 5,617,468 | 4/1997 | Nojima et al. | 455/421 |
| 5,749,052 | 5/1998 | Hidem et al. | 455/406 |
| 5,752,195 | 5/1998 | Tsuji et al. | 455/462 |

FOREIGN PATENT DOCUMENTS

| 0 633 684 A2 | 1/1995 | European Pat. Off. . | |
| 62-102634 | 5/1987 | Japan | H04B 7/26 |
| 63-133722 | 6/1988 | Japan | H04B 7/26 |
| 02168745 | 6/1990 | Japan | H04B 7/26 |
| 03006134 | 1/1991 | Japan | H04B 7/26 |
| 04247728 | 9/1992 | Japan | H04B 7/26 |
| 4-116449 | 10/1992 | Japan | H04M 1/02 |
| 06037715 | 2/1994 | Japan | H04B 7/26 |
| 06140990 | 5/1994 | Japan | H04B 7/26 |
| 2 151 883 | 7/1985 | United Kingdom . | |

OTHER PUBLICATIONS commercial Abstract for Canadian Patent No. CA2133859 to McGarry et al. on Jul. 1, 1995.

*Primary Examiner*—Edward F. Urban
*Assistant Examiner*—Tilahun Gesesse
*Attorney, Agent, or Firm*—Sheridan Ross P.C.

[57] ABSTRACT

A communications apparatus which has a man/machine interface to prevent or dissuade a user from performing a wasteful calling operation. In one implementation, the communications apparatus is suitable for transmission and reception and includes a display unit for displaying a content associated with a communication operation, a detector for checking whether a communication is available based upon a reception signal, and a display controller for inhibiting the unit from displaying the content when the communication is unavailable.

9 Claims, 8 Drawing Sheets

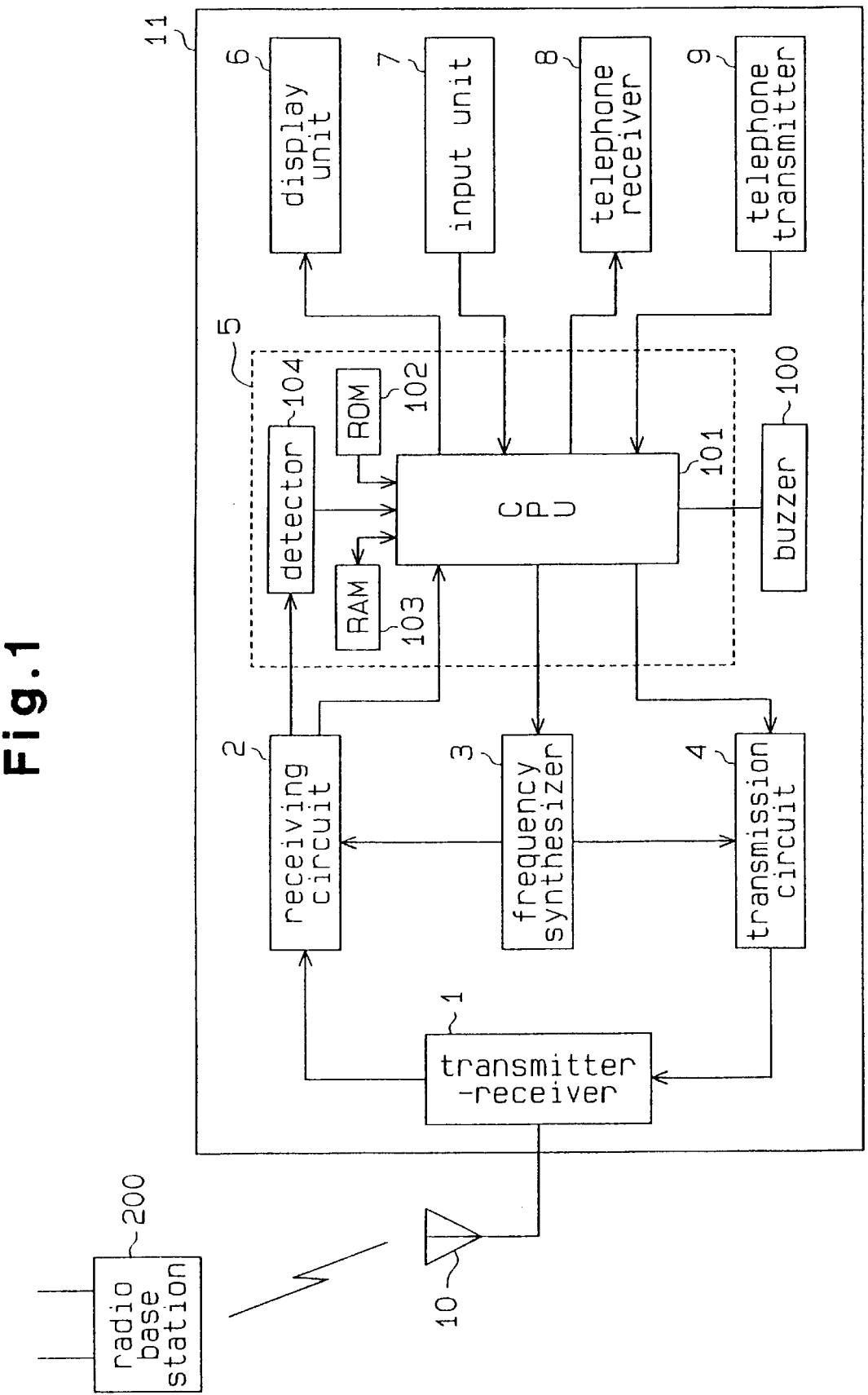

ALTERING DISPLAYED KEYS TO INDICATE AVAILABILITY OF SERVICE FOR A COMMUNICATIONS APPARATUS

BACKGROUND OF THE INVENTION

1. Field of the Invention

The present invention relates generally to a communications apparatus and, more particularly, to a communications apparatus including a portable telephone having a display panel.

2. Description of the Related Art

In a portable telephone communication system, radio communications are carried out between a portable telephone as a transmission side and a portable telephone as a reception side via a relay unit called a radio base station. The radio communications are enabled only when portable telephones are located within an area where the radio waves transmitted from the base station can reach (this area will be hereinafter called "service area"). It is therefore convenient for each user to check if his or her portable telephone is located in the service area of a radio base station. Japanese Unexamined Patent Publication No. 3-203417 discloses a portable telephone which is equipped with a function to display whether it is inside or outside the service area. When this type of portable telephone is located outside the service area of the radio base station no communications are possible. Although an indication that communications are not possible is displayed, the user may overlook that indication and try to make a call. This calling operation is wasteful and annoying to the user.

SUMMARY OF THE INVENTION

Broadly speaking, the present invention relates to a communications apparatus which has a man/machine interface to prevent a user from performing a wasteful calling operation.

As a communications apparatus suitable for transmission and reception includes: a display unit for displaying a content associated with a communication operation, a detector for checking whether a communication is available based upon a reception signal, and a display controller coupled to the display unit and the detector, for inhibiting the display unit from display the content when the communication is unavailable.

As a wireless communications apparatus for performing a communication via a base station having a service area, the apparatus includes: a display unit for displaying a content associated with a communication operation on a screen, a detector for checking whether the communication apparatus is currently located in the service area based upon a reception signal from the base station, a input unit for selecting a portion of the screen area, and a display controller, coupled to the display unit, the detector and the input unit, for inhibiting the display unit from displaying either the content in the selected portion of the screen area or the content in a remaining portion of the screen area excluding the selected portion of the screen area when a communications apparatus is located outside of the service area.

As a communications apparatus as a child unit for performing a communication via a parent unit having a covering area, the apparatus includes: a display unit having a screen for displaying a content associated with a communication operation, a detector for checking whether the communications apparatus is currently located inside the covering area based upon a reception signal from the parent unit, a input unit for selecting a portion of the screen area, and a display controller coupled to the display unit, the detector and the input unit, for inhibiting the display unit from displaying either the content in the selected portion of the screen area or the content in a remaining portion of the screen area excluding the selected portion of the screen area when the communications apparatus is located outside of the covering area.

As a communications apparatus suitable for transmission and reception includes: an input and display unit for displaying dial keys and operable to call with the dial keys, a detector for checking whether a communication is enabled or disabled based upon a reception signal, and a display controller, coupled to the input and display unit and the detector for inhibiting the display unit from displaying the dial keys when the communication is disabled.

As a communications apparatus for performing a communication via a base station having a service area, the apparatus includes: an input and display unit for displaying dial keys and operable to call with the dial keys, a detector for checking whether the communications apparatus is currently located inside the service area based upon a reception signal from the base station, and a display controller coupled to the input and display unit and the detector for inhibiting the display unit from displaying the dial keys when the communication apparatus is located out of the service area.

As a communications apparatus as a child unit for performing a communication via a parent unit having a covering area, the apparatus includes: an input and display unit for displaying dial keys and operable to call with the dial keys, a detector for checking whether the communications apparatus is currently located in the covering area based upon a reception signal from the parent unit, and a display controller coupled to the input and display unit and the detector for inhibiting the display unit from displaying the dial keys when the communication apparatus is located out of the covering area.

As a communications apparatus suitable for transmission and reception includes: a display unit for displaying a menu associated with communication process, a detector for checking whether a communication is enabled or disabled based upon a reception signal, and a display controller coupled to the display unit and the detector for inhibiting the display unit from displaying the menu when the communication is disabled.

As a communications apparatus for performing a communication via a base station having a service area, the apparatus includes: a display unit for displaying a menu associated with a communication process, a detector for checking whether the communications apparatus is currently located inside the service area based upon a reception signal from the base station, and a display controller, coupled to the display unit and the detector, for inhibiting the display unit from displaying the menu when the communications apparatus is located outside of the service area.

As a communication apparatus as a child unit for performing a communication via a parent unit having a covering area, the apparatus includes: a display unit for displaying a menu associated with a communication process, a detector for checking whether the communications apparatus is currently located inside the covering area based upon a reception signal from the parent unit, and a display controller, coupled to the input and display unit and the detector, for inhibiting the display unit from display the menu when the communications apparatus is located outside of the covering area.

As a communications apparatus suitable for transmission and reception includes: an input and display unit for displaying dial keys and operable to call with the dial keys, the input and display unit having two different display styles of the dial keys, a detector for checking whether a communication is enabled or disabled based upon a reception signal, and a display controller, coupled to the input and display unit and the detector, for allowing the display unit to display the dial keys with a first of the two different display styles when the communication is enabled and for allowing the display unit to display the dial keys with a second of the two different display styles when the communication in disabled.

As a communications apparatus suitable for transmission and reception includes: an input and display unit for displaying dial keys and operable to call with the dial keys, the input and display unit having two different display styles of the dial keys, a detector for detecting a level of a reception signal, and a display controller, coupled to the input and display unit and the detector, for controlling the display unit to change the display of the dial keys between the first and second display styles in accordance with the detected level of the reception signal.

As a communications apparatus suitable for transmission and reception includes: a display unit for displaying a content associated with a communication operation, a detector for checking whether a communication is enabled or disabled based upon a reception signal, a tone generator for generating tones, and a display and tone controller, coupled to the display unit, the detector and the tone generator, for inhibiting the display unit from displaying the content and for allowing the tone generator to generate tones when the communication is disabled.

As a communications apparatus suitable for transmission and reception includes: a telephone receiver for outputting a communication tone, a detector for checking whether a communication is enabled or disabled based upon a reception signal, and a voice controller, coupled to the telephone receiver and the detector, for allowing the telephone receiver to output the communication tone when the communication is enabled and for inhibiting the telephone receiver from outputting the communication tone when the communication is disabled.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 1 is a block diagram illustrating a portable telephone according to a first embodiment of the present invention;

DETAILED DESCRIPTION OF THE PREFERRED EMBODIMENTS

First Embodiment

Figure 2A:
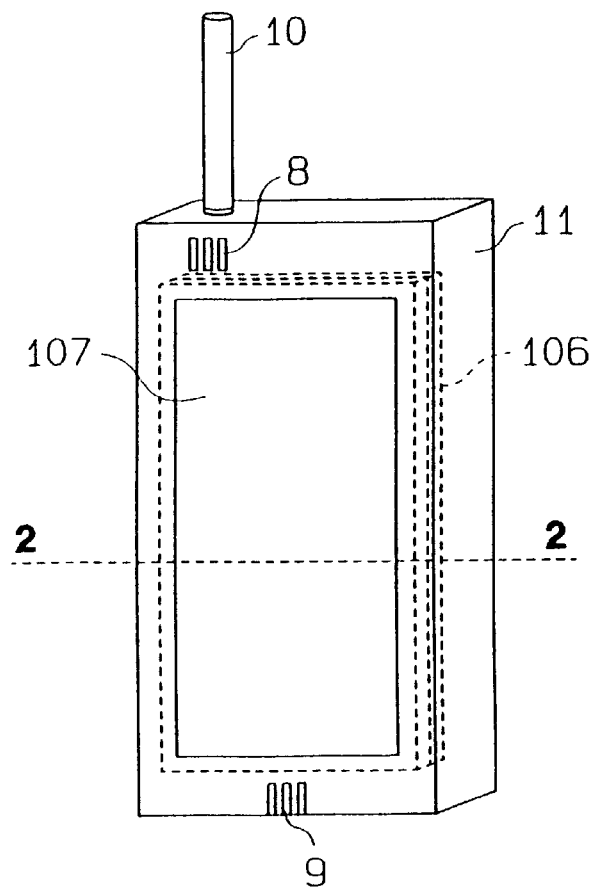
FIG. 2A is a schematic perspective view of a portable telephone having a tablet and an LCD.

A portable telephone as a communications apparatus according to a first embodiment of the present invention will be described referring to the accompanying drawings. FIG. 1 is a block diagram illustrating the portable telephone 11 according to the first embodiment. The portable telephone 11 comprises a transmitter-receiver 1, which is connected to an antenna 10 and includes a coupler and a filter, a receiving circuit 2 having a mixer and a demodulator, a frequency synthesizer 3, a transmission circuit 4 having a modulator and a power amplifier, a control circuit 5, a display unit 6, an input unit 7, a telephone receiver or earphone 8 which outputs voices and tones in accordance with audio and tone signals, a telephone transmitter or microphone 9 which converts input voices to audio signals, and a buzzer 100. In the first embodiment, the antenna 10 is affixed to or extendable from a casing 11 (see FIG. 2A) of the portable telephone 11. The portable telephone 11 may also use an external antenna instead of the antenna 10.

The transmitter-receiver 1 receives an RF (Radio Frequency) wave, which has been transmitted from a radio base station 200 and has been received at the antenna 10, and supplies the RF wave to the receiving circuit 2. The transmitter-receiver 1 also receives an RF signal supplied from the transmission circuit 4, and sends out it to the radio base station 200 via the antenna 10. The frequency synthesizer 3 selectively produces a frequency signal according to set data of a frequency channel in use supplied from the control circuit 5, and sends the frequency signal to the receiving circuit 2 or the transmission circuit 4 in accordance with the reception or transmission operation. The receiving circuit 2 converts the RF signal, supplied from the transmitter-receiver 1, to an intermediate frequency (IF) signal by using the frequency signal supplied from the frequency synthesizer 3. The receiving circuit 2 further demodulates the IF signal to produce a demodulated signal including an audio signal. The transmission circuit 4 modulates the audio signal, supplied from the microphone (telephone transmitter) 9 via the control circuit 5, to produce a transmission signal. The transmission circuit 4 further converts the transmission signal to an RF signal by using the frequency signal supplied from the frequency synthesizer 3, and sends the RF signal to the transmitter-receiver 1.

The control circuit 5 includes a central processing unit (CPU) 101, a ROM (Read Only Memory) 102 which has stored computer program data including display control program data, a RAM (Random Access Memory) 103 for temporarily storing data, and a detector 104. The detector 104 may alternatively be included in the receiving circuit 2. The CPU 101, which is connected to the circuits 2, 3 and 4, the units 6 and 7, the earphone (telephone receiver) 8, the microphone (telephone transmitter) 9 and the buzzer 100, controls those components and the entire system of the portable telephone 11.

The detector 104 receives a signal through the receiving circuit 2. The received signal is associated with the control channel included in the RF signal sent from the radio base station 200 and indicates the intensity of the radio wave. The detector 104 further sends a detection signal according to the reception level (or communication level) of the control channel signal to the CPU 101. The CPU 101 compares the level of the detection signal with a reference level set therein, and determines whether communication with the radio base station 200 is available based on the result of the comparison. More specifically, the CPU 101 determines that the portable telephone 11 is not communicable, i.e., the portable telephone 11 is located outside the service area of the base station 200, when the level of the detection signal is equal to or lower than the reference level, and determines that the portable telephone 11 is communicable when the level of the detection signal is greater than the reference level. If it is determined that the current state is not a communicable state even when the level of the detection signal exceeds the reference level, the CPU 101 analyzes the cause of that determination based upon the control channel signal.

Figure 2B:
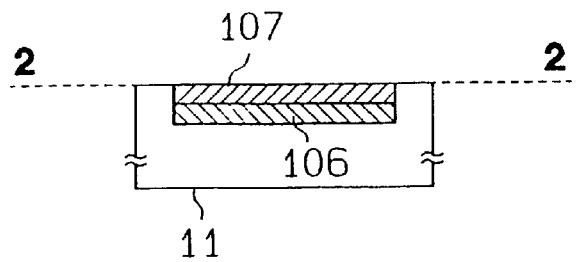
FIG. 2B is a schematic cross-sectional view along 2—2 line of the portable telephone in FIG. 2A.
Figure 3A:
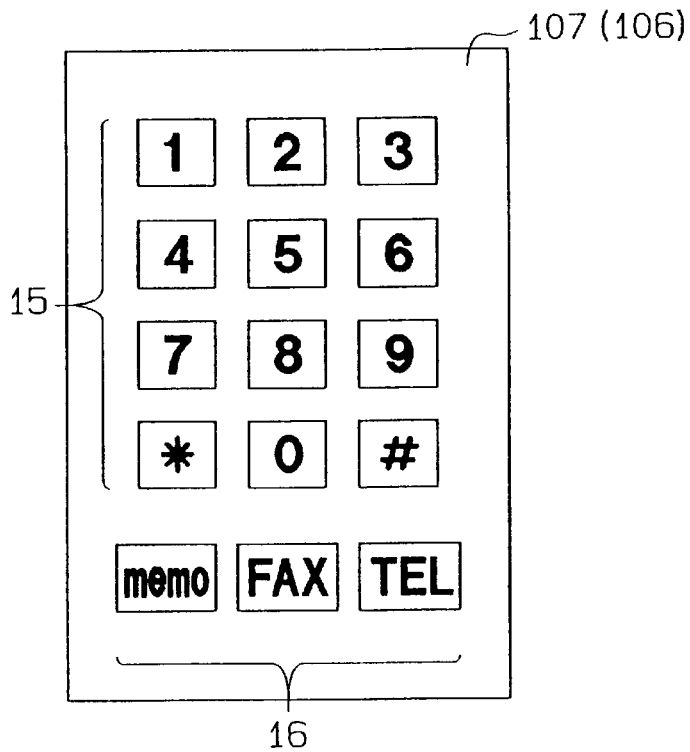
FIG. 3A is a diagram showing the display screen of the LCD in a communicable state.

According to the first embodiment, as shown in FIG. 2, the display unit 6 has an LCD (Liquid Crystal Display) 106 and unillustrated LEDs (Light Emitting Diodes). The input unit 7 is located on top of the LCD 106 and includes a transparent digitizer (or tablet) 107 through which data can be input. There are different types of digitizers, such as a pressure sensitive type, a capacitance type and an electromagnetic induction type. In the first embodiment, a pressure sensitive type of tablet, called a touch panel, is used as the digitizer 107. The LCD 106 displays on its screen ten keys (or dial keys) 15 for the entry of a dial number or the like and mode select keys 16 for selecting various function modes (MEMO, FAX and TEL in the illustrated example), as shown in FIG. 3A. A user can therefore perform the entry of a dial number associated with a calling operation, and an operation associated with the execution of various functions on the digitizer 107 by pressing the appropriate keys. The display unit 6 and the input unit 7 constitute a data inputtable display panel. When an electromagnetic induction type is used as the digitizer 107, the LCD 106 should be arranged over the digitizer 107 and a special writing tool like a stylus pen should be used. Also available is a display-integrated tablet (the display unit 6 integrated with the input unit 7) as disclosed in Japanese Unexamined Patent Publication No. 5-53726.

Figure 4:
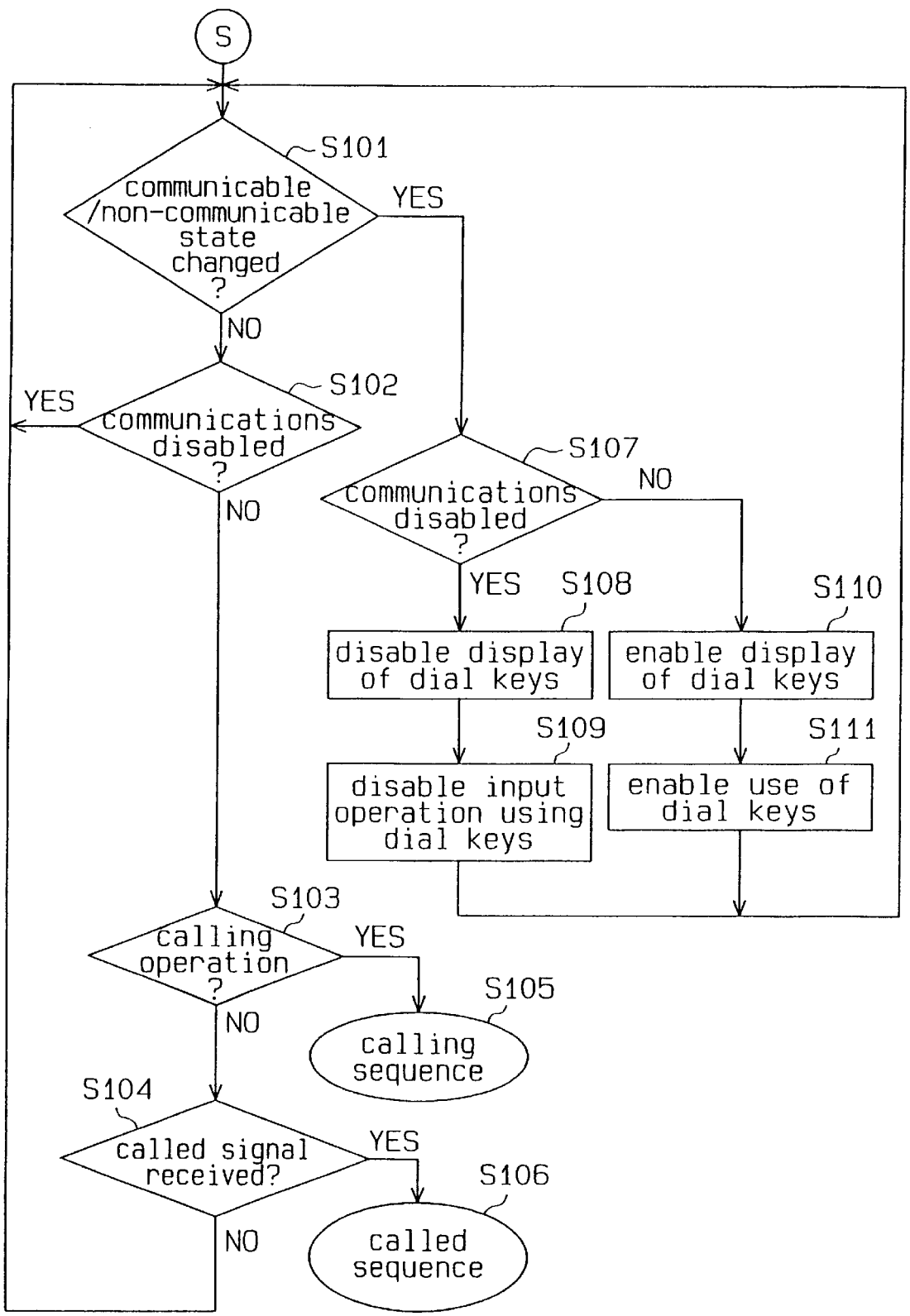
FIG. 4 is a flowchart illustrating operation of the portable telephone according to a first embodiment.

The operation of the portable telephone according to the first embodiment of the invention will be now discussed with reference to the flowchart illustrated in FIG. 4. In step S101, with the portable telephone 11 in a standby mode, the CPU 101 stores detection signals, continuously supplied from the detector 104, into the RAM 103 determines communicable/non-communicable results, and compares the result of the determination based upon the previously supplied detection signal with the result of the determination based upon the subsequent detection signal to determine if the communicable/non-communicable state has changed during a predetermined period of time. When there is no status change, the CPU 101 determines if communications are currently disabled (non-communicable state) in step S102. If communications are determined to be disabled, the CPU 101 returns to step S101. On the other hand, if it is determined that communications are enabled (communicable state) in step S102, the CPU 101 determines in step S103 whether the user has performed a calling operation (the selection of the TEL mode in this example) on the digitizer 107 based upon a coordinate data signal supplied from the digitizer 107. In other words, the CPU 101 determines if the user wants to establish communications. When it is determined that no calling operation has been executed, the CPU 101 determines in step S104 if a call acknowledge signal or a called signal has been received from other party via a telephone line and the radio base station 200.

When the coordinate data signal, associated with the calling operation by the user, is received from the digitizer 107 in step S103, the CPU 101 causes an unillustrated tone generator to perform ringing in accordance with the calling sequence in step S105, thus establishing a call to the radio base station 200 from the portable telephone 11. When the called signal has been received in step S104, the CPU 101 performs a called operation according to the called sequence and produces a ringing sound from the buzzer 100 or displays something to indicate the reception of the called signal on the screen of the LCD 106 in order to inform the user of the called sequence in step S106.

Figure 3B:
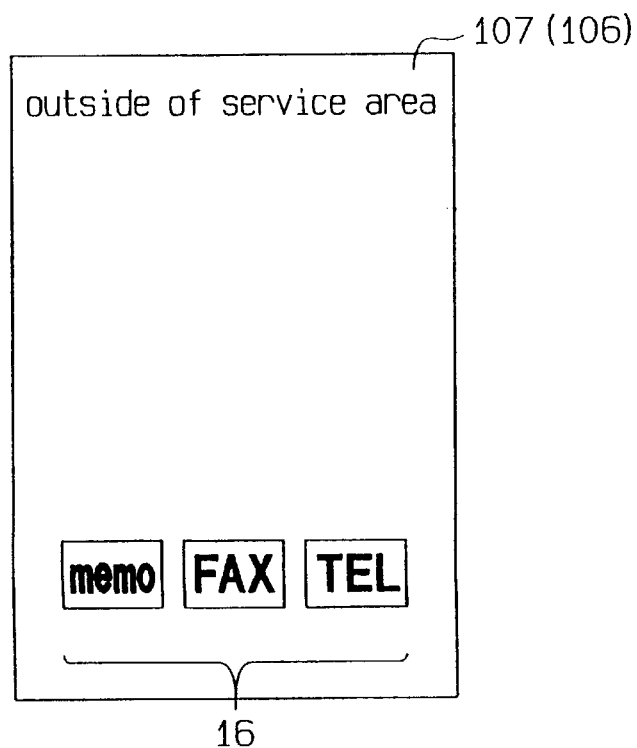
FIG. 3B is a diagram showing the display screen of the LCD in a non-communicable state.

When having determined in step S101 that the communicable/non-communicable state has changed, the CPU 101 further determines in step S107 whether communications have changed to the non-communicable state. When it is determined that the portable telephone 11 has changed to the non-communicable state, the CPU 101 controls the LCD 106 so as not to show the dial keys 15 on the screen of the LCD 106 as shown in FIG. 3B in step S108, and disables (or inhibits) the input operation through the dial keys 15 in step S109. By such operations, the user is alerted to the non-communicable state at a glance and prevented from performing a wasteful dialing operation and calling operation. In addition, by not displaying dial keys 15, the consumed power of the portable telephone 11 is reduced. On the other hand, when it is determined in step S107 communicable state, the CPU 101 controls the LCD 106 so as to show the dial keys 15 on the screen of the LCD 106 as shown in FIG. 3A in step S110, and enables (or permits) the input operation through dial keys 15 by the user in step S111.

Ten modifications of the first embodiment will be discussed below.

First Modification: When it is determined as non-communicable in step S107, the CPU 101 controls the LCD 106 in such a way as to not only show the dial keys 15 but also display a message indicative of the reason for the non-communicable state, the current status or the like in step S108. This allows the user to understand the reason for the non-communicable state at a glance and prevents the user from performing a wasteful calling operation. In this case, the content of step S108 in the flowchart illustrated in FIG. 4 should be changed to "DISABLE THE DISPLAY OF DIAL KEYS AND ENABLE THE DISPLAY OF A MESSAGE OF DISABLED COMMUNICATION" and the content of step S110 should be changed to "ENABLE THE DISPLAY OF DIAL KEYS AND DISABLE THE DISPLAY OF A MESSAGE OF DISABLED COMMUNICATION."

Figure 5A:
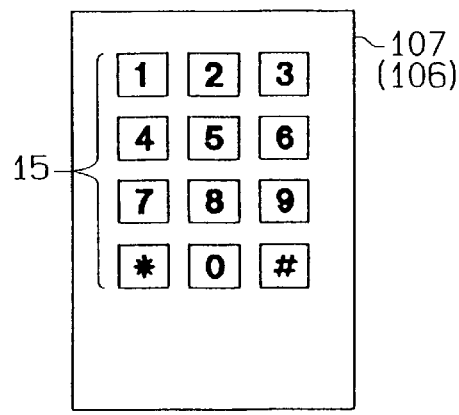
FIG. 5A is a diagram showing the display screen of the LCD in a communicable state.
Figure 5B:
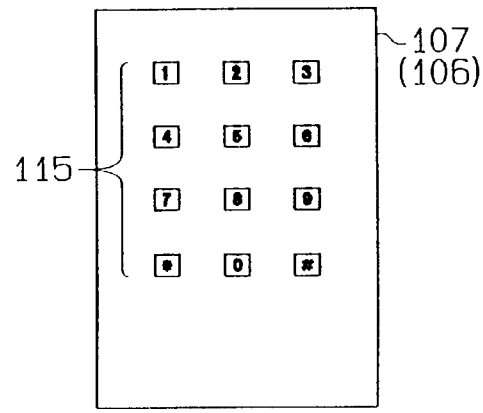
FIGS. 5B and 5C are diagrams showing the display screens of the LCD in a non-communicable state according to a second modification of the first embodiment.
Figure 5C:
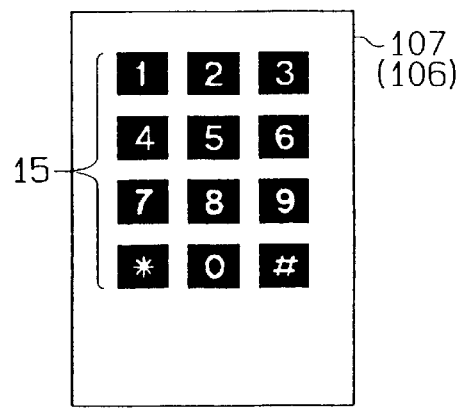

Second Modification: In step S108, the CPU 101 controls the LCD 106 so as to show the dial keys 15 in a display style (or mode) different from the ordinary display style. In this case, the content of step S108 in the flowchart illustrated in FIG. 4 should be changed to "CHANGE DISPLAY STYLE OF DIAL KEYS." For example, as illustrated in FIG. 5B, the dial keys 115 can be displayed in smaller sizes than the dial keys 15 in the normal state shown in FIG. 5A. This display scheme permits the user to see the non-communicable state at a glance. Alternatively, the dial keys 15 may be blinked. There are three other possible examples. When a monochromatic panel which can provide binary (black and white) display is used for the LCD 106, (1) the dial keys 15 may be highlighted as shown in FIG. 5C, or (2) the dial keys 15 may be displayed in gradation. When a color panel is employed for the LCD 106, the color of the dial keys 15 may be changed to a color different from the color of the background of the screen.

Third Modification: When it is determined as communicable in step S107, the CPU 101 controls the LCD 106 in step S110 in such a way that the display style of the dial keys 15 is changed in accordance with the level of the detection signal from the detector 104 (reception level). This control eliminates the exclusive area for displaying the status of the communication level on the screen of the LCD 106, thus increasing the available area of the screen. In this case, the content of step S110 in the flowchart illustrated in FIG. 4 should be changed to "CHANGE DISPLAY STYLE OF DIAL KEYS ACCORDING TO RECEPTION LEVEL." For example, the size of the dial keys 15 may be altered in accordance with the reception level. More specifically, the dial keys 15 may be displayed in a large (or normal) size when the reception level is high, and the dial keys 15 may be displayed in a smaller size as the reception level becomes lower. As another example, the dial keys 15 may be blinked and the blinking speed may be changed in accordance with the reception level. For example, the dial keys 15 may be blinked at a slow blinking speed when the reception level is high, and the dial keys 15 may be blinked at a higher blinking speed as the reception level becomes lower.

There are two other possible examples. First, when a monochromatic panel which can provide a multi-gradation display is used for the LCD 106, the display color of the dial keys 15 may be changed to a different gradation color in accordance with the reception level. More specifically, the dial keys 15 whose color is close to the normal display color may be displayed when the reception level is high, and the dial keys 15 having a color closer to the highlighted color may be displayed as the reception level becomes lower. Second, when a color panel is used for the LCD 106, the display color of the dial keys 15 may be changed to a different gradation color in accordance with the reception level. More specifically, the dial keys 15 may be displayed in a greenish color when the reception level is high, and the display color of the dial keys 15 may be changed from the greenish color to a yellowish color which may further be changed to a reddish color as the reception level becomes lower.

Fourth Modification: Instead of determining the communicable/non-communicable state, the CPU 101 determines if the portable telephone 11 is located in the service area based upon the reception level of the control channel signal transmitted from the radio base station 200. In this case, the content of step S101 in the flowchart illustrated in FIG. 4 should be changed to "STATUS OF INSIDE/OUTSIDE SERVICE AREA CHANGED?", the content of step S102 should be changed to "INSIDE SERVICE AREA?" and the content of step S107 should be changed to "OUTSIDE SERVICE AREA?" When the reception level is equal to or lower than the reference level and it is determined that the portable telephone 11 is out of the service area, the CPU 101 clears the display (inhibits the display) of the dial keys 15 and displays something to indicate that the portable telephone 11 is out of the service area. This scheme allows the user to see at a glance that the communications are disabled and to understand the reason for the non-communicable state. In this case, the content of step S108 in the flowchart illustrated in FIG. 4 should be changed to "DISABLE THE DISPLAY OF DIAL KEYS AND ENABLE THE INDICATION OF OUTSIDE SERVICE AREA" and the content of step S110 should be changed to "ENABLE THE DISPLAY OF DIAL KEYS AND DISABLE THE INDICATION OF OUTSIDE SERVICE AREA."

Fifth Modification: This embodiment is adapted to a cordless telephone system where the radio base station 200 is a parent unit and the portable telephone 11 is a mobile unit (child unit). Instead of determining the communicable/non-communicable state, the CPU 101 determines if the child unit 11 is located in the covering area of the parent unit 200 based upon the reception level of the signal transmitted from the parent unit 200. In this case, the content of step S101 in the flowchart illustrated in FIG. 4 should be changed to "STATUS OF INSIDE/OUTSIDE COVERING AREA OF PARENT UNIT CHANGED?", the content of step S102 should be changed to "INSIDE COVERING AREA OF PARENT UNIT?" and the content of step S107 should be changed to "OUTSIDE COVERING AREA?"

Sixth Modification: When the CPU 101 determines that the reception level is equal to or lower than the reference level in the fifth modification, the CPU 101 clears the display of the dial keys 15 and displays something to indicate that the child unit 11 is outside the covering area of the parent unit 200. In this case, the content of step S108 in the flowchart illustrated in FIG. 4 should be changed to "DISABLE THE DISPLAY OF DIAL KEYS AND ENABLE THE INDICATION OF OUTSIDE COVERING AREA OF PARENT UNIT" and the content of step S110 should be changed to "ENABLE THE DISPLAY OF DIAL KEYS AND DISABLE THE INDICATION OF OUTSIDE COVERING AREA OF PARENT UNIT."

Figure 5D:
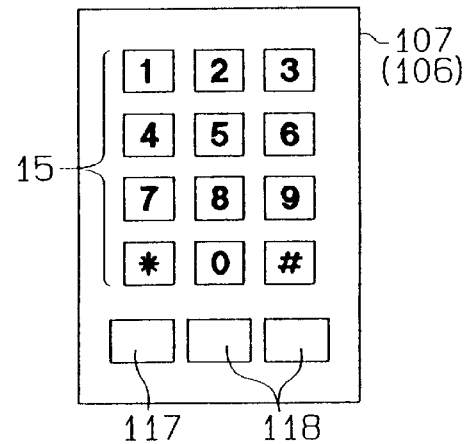
FIG. 5D is a diagram showing the display screen of the LCD in a communicable state according to a seventh modification of the first embodiment.
Figure 5E:
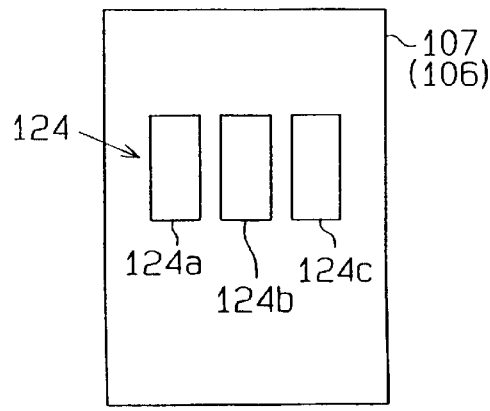
FIGS. 5E and 5F are diagrams showing the display screens of a display area select menu in a display area select mode in the seventh modification.

Seventh Modification: When the portable telephone 11 is non-communicable or is outside the service area or the covering area of the parent unit, the CPU 101 controls the LCD 106 in such a way that the operation key associated with calling is erased in accordance with the user's selection. As shown in FIG. 5D, in the communicable state, the CPU 101 displays the operation keys, such as the dial keys 15, a call key 117 which is used to make a call, and one-touch dial keys 118 which can make a call with a one-touch operation, on the screen of the LCD 106. In this case, the portable telephone 11 has a display key select mode under which the CPU 101 controls the LCD 106 so as to display a display key select menu which allows the user to select at least one of the individual operation keys which are to be erased when communications are disabled. As shown in FIG. 5E the display key select menu 124 includes a dial key select 124a, a call key select 124b and an one-touch dial key select 124c. Suppose that the user has selected the call key 124a on the display key select menu 124. In this case, the CPU 101 in the communicable state controls the LCD 106 to clear the display (inhibits the display) of the call key 117. The content of step S108 in the flowchart illustrated in FIG. 4 is changed to "DISABLE THE DISPLAY OF SELECTED KEY" and the content of step S110 is changed to "ENABLE THE DISPLAY OF SELECTED KEY."

Figure 5F:
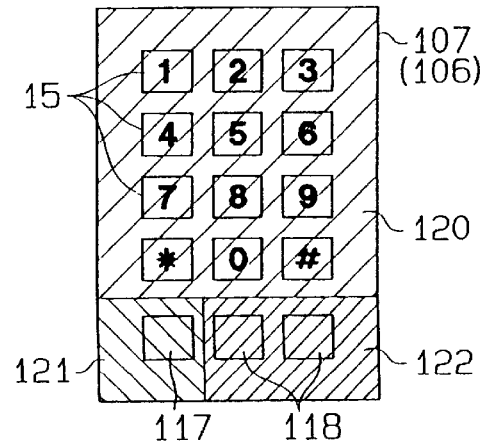

The portable telephone 11 may be provided with a display area select mode instead of the display key select mode. In this case, the CPU 101 controls the LCD 106 in such a way as to display on the screen the display area select menu to allow the user to select at least one of a plurality of segmented display areas whose display contents are to be erased when communications are disabled. This display area select menu is displayed in such a way that a first area 120 includes the dial keys 15, a second area 121 includes the call key 117, and a third area 122 includes the one-touch dial keys 118, as shown in FIG. 5F. Assume that the user has selected the first area 120 on the display area select menu. In this case, in the non-communicable state, the CPU 101 controls the LCD 106 so as to erase the display contents of the first area 120 (dial keys 15) or inhibit the display. This feature allows the user to see at a glance that the communications are disabled, prevents the user from performing a wasteful calling operation, and contributes to the reduction of consumed power.

Eighth Modification: The CPU 101 further controls the LCD 106 in the seventh modification in such a way as to erase the operation key associated with calling or the contents of a display area in accordance with the user's selection, and to display a message representing the reason for the non-communicable state or the current status. This feature allows the user to recognize the non-communicable state and prevents the user from performing a wasteful calling operation. When communications are not possible, the content of step S108 in the flowchart illustrated in FIG. 4 is changed to "DISABLE THE DISPLAY OF SELECTED KEY OR AREA AND ENABLE THE DISPLAY OF A MESSAGE INDICATIVE OF DISABLED COMMUNICATION" and the content of step S110 is changed to "ENABLE THE DISPLAY OF SELECTED KEY OR AREA AND DISABLE THE DISPLAY OF A MESSAGE INDICATIVE OF DISABLED COMMUNICATION." When the portable telephone 11 is not located in the service area, the content of step S108 is changed to "DISABLE THE DISPLAY OF SELECTED KEY OR AREA AND ENABLE THE INDICATION OF OUTSIDE SERVICE AREA" and the content of step S110 is changed to "ENABLE THE DISPLAY OF SELECTED KEY OR AREA AND DISABLE THE INDICATION OF OUTSIDE SERVICE AREA." When the child unit is out of the covering area of the parent unit, the content of step S108 is changed to "DISABLE SELECTIVE DISPLAY AND ENABLE THE INDICATION OF OUTSIDE COVERING AREA OF PARENT UNIT" and the content of step S110 is changed to "ENABLE SELECTIVE DISPLAY AND DISABLE THE INDICATION OF OUTSIDE COVERING AREA OF PARENT UNIT."

Ninth Modification: When the portable telephone 11 is non-communicable or is outside the service area or the covering area of the parent unit, the CPU 101 controls the LCD 106 in such a way as to erase (inhibit) all the display contents on the screen of the LCD 106. In this case, the content of step S108 in the flowchart illustrated in FIG. 4 is changed to "DISABLE ENTIRE DISPLAY" and the content of step S110 is changed to "ENABLE ENTIRE DISPLAY." To avoid erroneous confirmation of power loss, the CPU 101 erases the entire display on the screen of the LCD 106 and lights an unillustrated power lamp.

Tenth Modification: The CPU 101 further controls the LCD 106 in the ninth modification in such a way as to temporarily erase the entire display contents on the screen and to display a message indicating the reason for the non-communicable state or the current status. In this case, the content of step S108 in the flowchart illustrated in FIG. 4 is changed to "DISABLE ENTIRE DISPLAY AND ENABLE THE DISPLAY OF A MESSAGE INDICATIVE OF DISABLED COMMUNICATION" and the content of step S110 is changed to "ENABLE ENTIRE DISPLAY AND DISABLE THE DISPLAY OF A MESSAGE INDICATIVE OF DISABLED COMMUNICATION."

Second Embodiment

Figure 6:
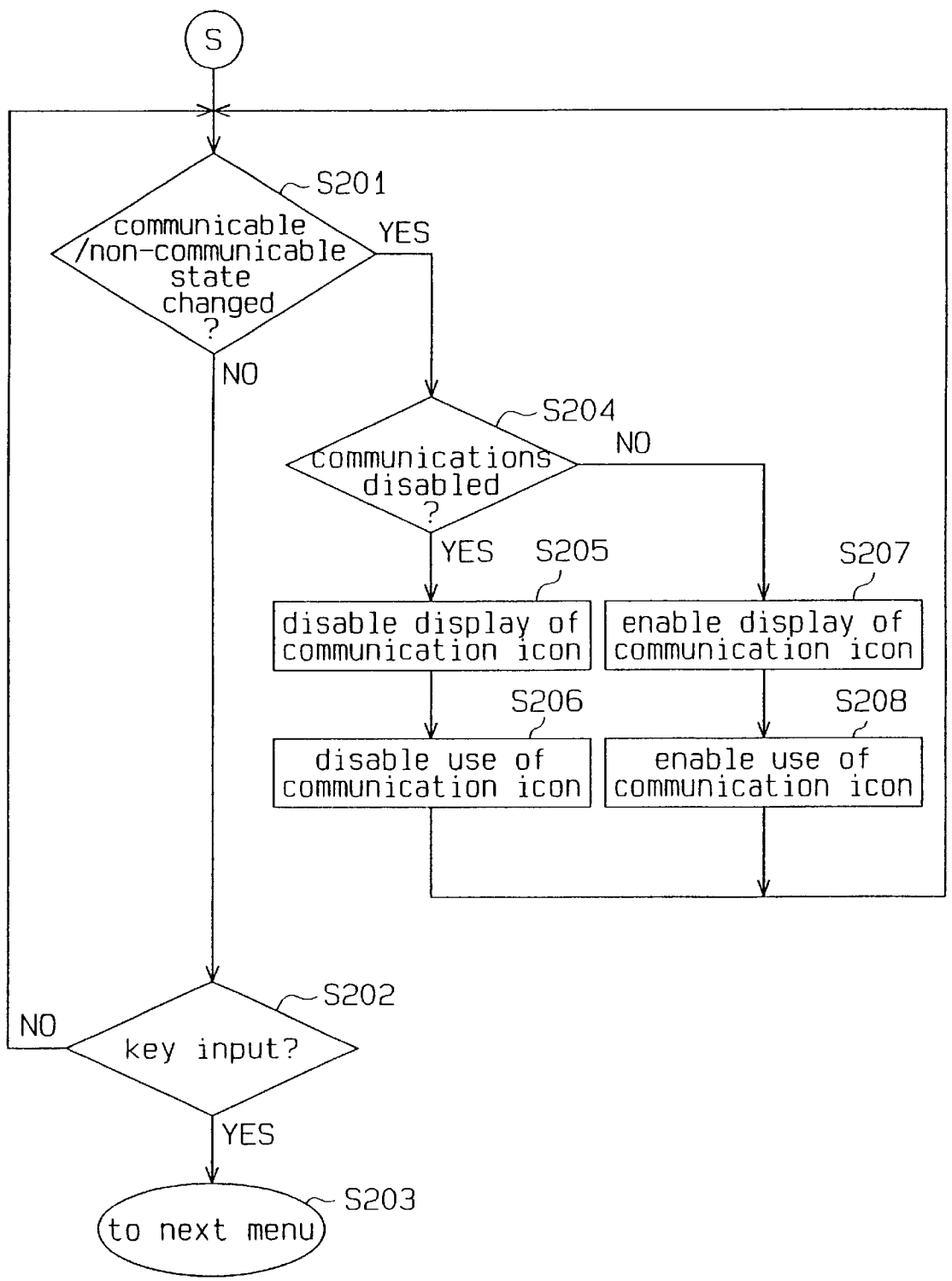
FIG. 6 is a flowchart illustrating the operation of the portable telephone according to a second embodiment of the invention.
Figure 7A:
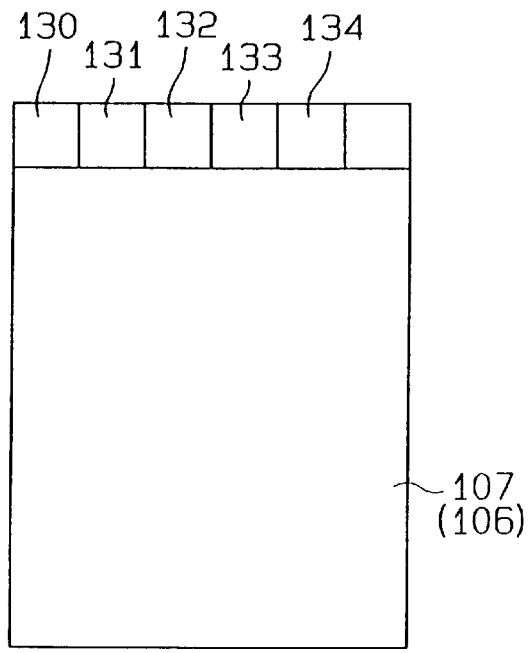
FIG. 7A is a diagram showing the display screen of individual function icons in a standby mode.

A portable telephone according to a second embodiment of the invention will be now described. To avoid the redundant description, like or same reference numerals are given to those components which are the same as the corresponding components of the first embodiment. FIG. 6 is a flowchart illustrating the operation of the portable telephone 11 according to the second embodiment. The second embodiment is embodied in, for example, a multi-function portable telephone which has not only the telephone function but also other functions such as a memorandum function, an address book function, a calculator function and a FAX function. As shown in FIG. 7A, in the initial state, the CPU 101 controls the LCD 106 to display a communication icon 130 corresponding to the telephone function, a memo icon 131 corresponding to the memorandum function, an address icon 132 corresponding to the address book function, a calculator icon 133 corresponding to the calculator function and a FAX icon 134 corresponding to the FAX function. The CPU 101 further controls the LCD 106 to display on the screen a menu (not shown) which is associated with the execution of a function corresponding to an icon selected by the user.

A description will now be given of the operation of the portable telephone 11 according to the second embodiment in a standby mode with reference to FIG. 6. In step S201, the CPU 101 determines if the communicable/non-communicable state has changed during a predetermined period of time based upon the reception level of the control channel signal sent from the base station 200. When there is no status change in step S201, the CPU 101 determines in step S202 if the user has selected an icon. When the icon selection has been made, the CPU 101 controls the LCD 106 to display on the screen the menu which is associated with the execution of a function corresponding to the selected icon. When the calculator icon 133 has been selected, for example, the calculator function menu is displayed on the screen. When it is determined in step S202 that no icon has been selected, the flow returns to step S201 to determine if the communicable/non-communicable state has changed.

Figure 7B:
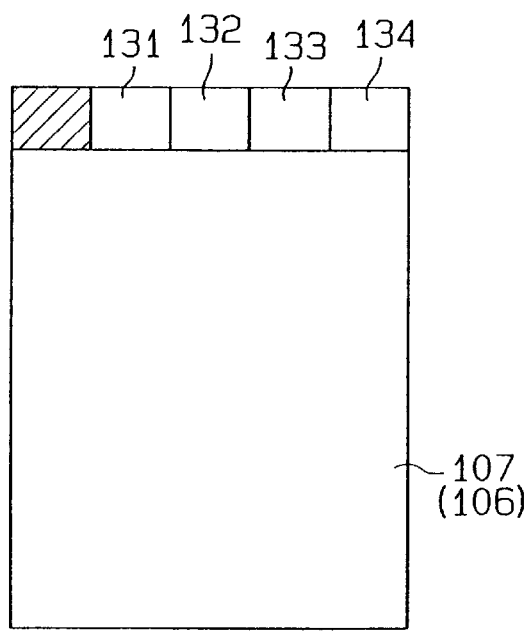
FIG. 7B is a diagram of the display screen showing that the display of a communication icon is disabled in a non-communicable state.

When it is determined in step S201 that there has been a status change, the CPU 101 determines in step S204 if communications are currently disabled. If it is determined that no communications are possible (non-communicable state), the CPU 101 controls the LCD 106 to erase (disable) the display of the communication icon 130 as shown in FIG. 7B in step S205. In the subsequent step S206, the CPU 101 disables the selection of the communication icon 130 and controls the LCD 106 so as to not display the communication process menu associated with the communication icon 130 on the screen. This control disables use of the communication processing menu by the user. Thus, the second embodiment allows the user to see the non-communicable state at a glance and prevents the user from performing a wasteful dialing operation and calling operation.

When it is however determined in step S204 that communications are possible (communicable state), the CPU 101 controls the LCD 106 to enable the display of the communication icon in step S207. In the next step S208, the CPU 101 enables the selection of the communication icon 130 (allows the acceptance of the communication icon 130) as well as the communication process menu associated with the communication icon 130.

Four modifications of the second embodiment will be now discussed.

First Modification: When no communications are possible, the CPU 101 controls the LCD 106 in such a way as to inhibit the display of the communication icon and display a message indicative of the reason for the non-communicable state, the current status or the like. This allows the user to recognize the reason for the non-communicable state. In this case, the content of step S205 in the flowchart illustrated in FIG. 6 is changed to "DISABLE THE DISPLAY OF COMMUNICATION ICON AND ENABLE THE DISPLAY OF A MESSAGE INDICATIVE OF DISABLED COMMUNICATION" and the content of step S207 is changed to "ENABLE THE DISPLAY OF COMMUNICATION ICON AND DISABLE THE DISPLAY OF A MESSAGE INDICATIVE OF DISABLED COMMUNICATION."

Second Modification: The CPU 101 determines if the portable telephone 11 is located in the service area based upon the reception level of the control channel signal from the radio base station 200. In this case, the content of step S201 in the flowchart illustrated in FIG. 6 is changed to "STATUS OF INSIDE/OUTSIDE SERVICE AREA CHANGED?", and the content of step S204 is changed to "OUTSIDE SERVICE AREA." When it is determined in this manner that the portable telephone 11 is out of the service area, the display of the communication icon is inhibited.

Third Modification: When the portable telephone 11 is out of the service area, the CPU 101 inhibits the display of the communication icon and controls the LCD 106 so as to display something to indicate that the portable telephone 11 is out of the service area. This scheme allows the user to see at a glance that the communications are disabled and to understand the reason for the non-communicable state. In this case, the content of step S205 in the flowchart illustrated in FIG. 6 is changed to "DISABLE THE DISPLAY OF COMMUNICATION ICON AND ENABLE THE INDICATION OF OUTSIDE SERVICE AREA" and the content of step S207 is changed to "ENABLE THE DISPLAY OF COMMUNICATION ICON AND DISABLE THE INDICATION OF OUTSIDE SERVICE AREA."

Fourth Modification: In a cordless telephone system as in the fifth modification of the first embodiment, the CPU 101 determines if the child unit is located in the covering area of the parent unit as the base station 200 based upon the reception level of the signal transmitted from the parent unit. If the child unit is out of the covering area of the parent unit, the CPU 101 inhibits the display of the communication icon on the screen. In this case, the content of step S201 in the flowchart illustrated in FIG. 6 is changed to "STATUS OF INSIDE/OUTSIDE COVERING AREA OF PARENT UNIT CHANGED?", the content of step S204 is changed to "OUTSIDE COVERING AREA OF PARENT UNIT?", the content of step S205 is changed to "DISABLE THE DISPLAY OF COMMUNICATION ICON AND ENABLE THE INDICATION OF OUTSIDE COVERING AREA OF PARENT", and the content of step S207 is changed to "ENABLE THE DISPLAY OF COMMUNICATION ICON AND DISABLE THE INDICATION OF OUTSIDE COVERING AREA OF PARENT UNIT."

Third Embodiment

Figure 8:
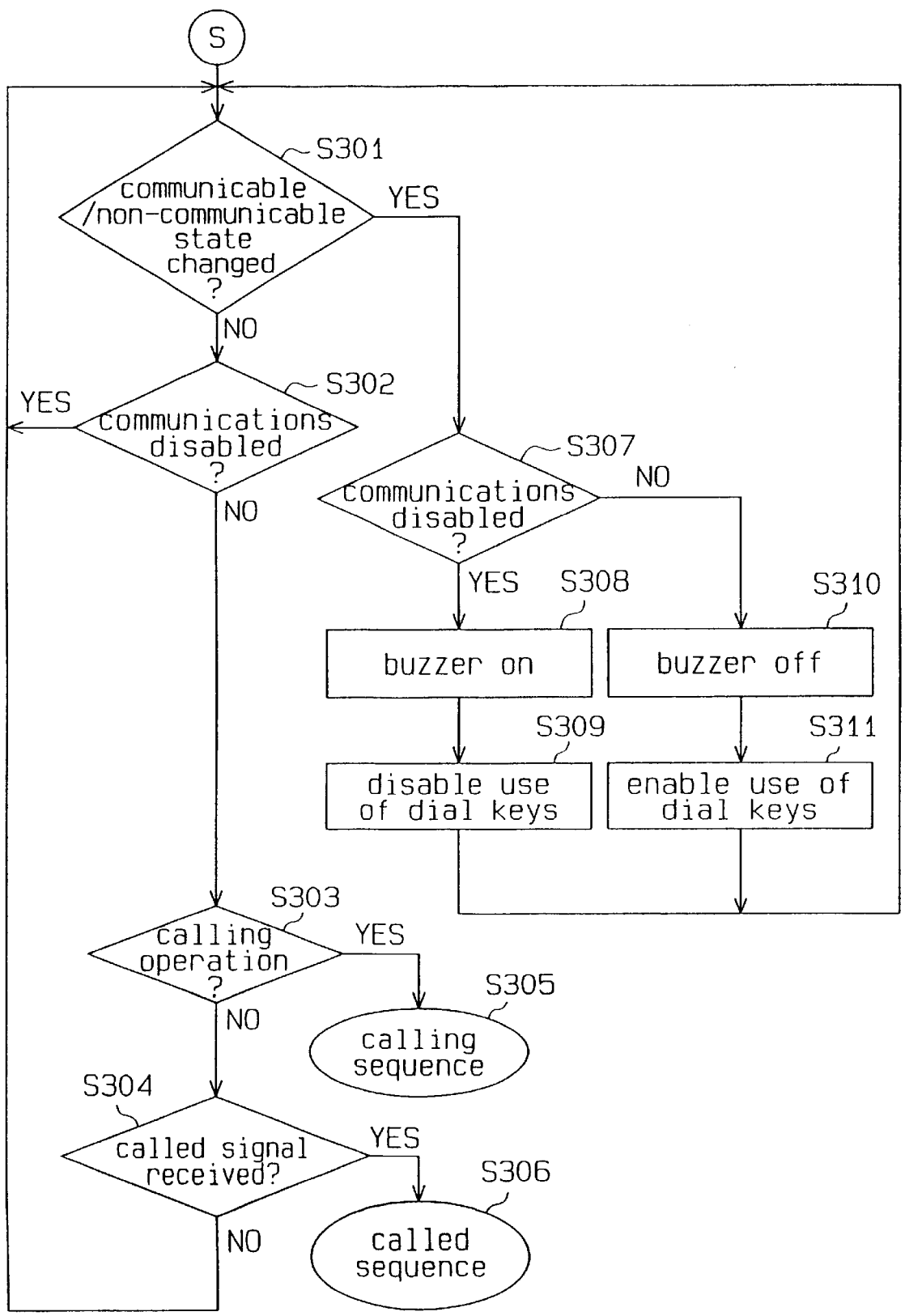
FIG. 8 is a flowchart illustrating operation of the portable telephone according to a third embodiment of the invention.

A portable telephone according to a third embodiment of the invention will be now described. To avoid the redundant description, like or same reference numerals are given to those components which are the same as the corresponding components of the first embodiment. FIG. 8 is a flowchart illustrating the operation of the portable telephone 11 according to the third embodiment.

Because steps S301 to S307 in the third embodiment respectively correspond to steps S101 to S107 in the first embodiment, their detailed descriptions will not be given.

When the CPU 101 determines in step S307 that communications are currently not possible (non-communicable state), the CPU 101 activates the buzzer 100 in step S308 and disables the input operation using the dial keys 15 in step S309. This feature permits the user to confirm the non-communicable state without seeing the screen and prevents the user from performing a wasteful calling operation. On the other hand, when the communications status is changed to the communicable state from the non-communicable state, the CPU 101 deactivates the buzzer 100 in step S310 and enables the input operation using the dial keys 15 in step S311.

Two modifications of the third embodiment will be now discussed.

First Modification: In step S308, the CPU 101 controls the earphone (telephone receiver) 8 to send out an audio message indicative of the non-communicable state. This feature permits the user to confirm the non-communicable state without seeing the screen. The audio data of the audio message is previously stored in the ROM 102. In this case, the content of step S308 in the flowchart in FIG. 8 is changed to "ENABLE AUDIO INFORMING FROM EARPHONE" and the content of step S310 is changed to "DISABLE AUDIO INFORMING FROM EARPHONE."

Second Modification: In step S308, the CPU 101 controls the earphone (telephone receiver) 8 to not generate a communication permission tone. This feature permits the user to confirm the non-communicable state without seeing the screen. In this case, the content of step S308 in the flowchart in FIG. 8 is changed to "DISABLE COMMUNICATION TONE FROM EARPHONE" and the content of step S310 is changed to "ENABLE COMMUNICATION TONE FROM EARPHONE."

Although only three embodiments of the present invention have been described herein, it should be apparent to those skilled in the art that the present invention may be embodied in many other specific forms without departing from the spirit or scope of the invention. Particularly, it should be understood that this invention may be embodied in the following forms. The display actions may be accomplished using an LED (not shown) instead of the LCD 106. For example, the message display in the first, eight and ninth modifications of the first embodiment and the first modification of the second embodiment, the indication of the portable telephone being out of the service area in the fourth modification of the first embodiment and the third modification of the second embodiment, and the indication of the child unit being out of the covering area of the parent unit in the sixth modification of the first embodiment, can all be accomplished using an LED.

Therefore, the present examples and embodiments are to be considered as illustrative and not restrictive and the invention is not to be limited to the details given herein, but may be modified within the scope of the appended claims.

What is claimed is:

1. A communications apparatus suitable for transmission and reception, comprising:

an input and display unit for displaying dial keys and operable to call with the dial keys, wherein said dial keys exist as a visual representation of physical dial keys and wherein said visual representation corresponds to areas of said input and display unit that are capable of sensing a user's touch, a detector for checking whether a communication is disabled based upon a reception signal, and a display controller, coupled to said input and display unit and said detector for emphasizing the displayed dial keys when the communication is disabled to enable a user to readily ascertain that communication is disabled, wherein said emphasizing includes at least one of changing a size, color and shading of the displayed dial keys.

2. The apparatus according to claim 1, wherein, when the communication is disabled, said display controller allows said input and display unit to display a message associated with the disabled communication.

3. The communications apparatus of claim 1, wherein the display controller emphasizes all of the displayed dial keys when the communication is disabled.

4. A communications apparatus for performing a communication via a base station having a service area, said apparatus comprising:

an input and display unit for displaying dial keys and operable to call with the dial keys, wherein said dial keys exist as a visual representation of physical dial keys and wherein said visual representation corresponds to areas of said input and display unit that are capable of sensing a user's touch, a detector for checking whether said communications apparatus is currently located inside said service area based upon a reception signal from said base station, and a display controller coupled to said input and display unit and said detector for emphasizing the displayed dial keys when the communication apparatus is located out of said service area to enable a user to readily ascertain that communication is disabled, wherein said emphasizing includes at least one of changing a size, a color and a shading of the displayed dial keys.

5. The apparatus according to claim 4, wherein said display controller allows said input and display unit to display a message indicative of said apparatus being out of said service area.

6. A communications apparatus as a child unit for performing a communication via a parent unit having a covering area, the apparatus comprising:

an input and display unit for displaying dial keys and operable to call with the dial keys, wherein said dial keys exist as a visual representation of physical dial keys and wherein said visual representation corresponds to areas of said input and display unit that are capable of sensing a user's touch, a detector for checking whether said communications apparatus is currently located in said covering area based upon a reception signal from said parent unit, and a display controller coupled to said input and display unit and said detector for emphasizing the displayed dial keys when the communication apparatus is located out of said covering area to enable a user to readily ascertain that communication is disabled, wherein said emphasizing includes at least one of changing a size, a color and a shading of the displayed dial keys.

7. The apparatus according to claim 6, wherein said display controller allows said input and display unit to display a message indicative of said apparatus being out of said covering area.

8. A communications apparatus suitable for transmission and reception, comprising:

an input and display unit for displaying a plurality of dial keys and operable to call with said plurality of dial keys, wherein said dial keys exist as a visual representation of physical dial keys and wherein said visual representation corresponds to areas of said input and display unit that are capable of sensing a user's touch;

a detector for checking whether a communication is disabled based upon a reception signal; and a display controller, coupled to said input and display unit and said detector for a) in a first mode enabling the display of said plurality of dial keys when at least one of said transmission and reception is possible; and b) in a second mode changing a characteristic of the display of said plurality of dial keys in the first mode when at least one of transmission and reception is disabled, wherein in said second mode the characteristic is at least one of a size, color and shading of said plurality of dial keys, wherein it is made readily apparent to a user whether at least one of transmission and reception is possible or whether at least one of transmission and reception is disabled.

9. A method for indicating whether a portable communications device is enabled, comprising the steps of:

detecting the presence of a communications signal of a prescribed strength;

providing a display having a plurality of displayed dial keys;

displaying said plurality of dial keys in a first mode when said dial keys are operable to establish a communications link;

displaying said plurality of dial keys in a second mode when said dial keys are inoperable to establish a communications link, wherein in said second mode a characteristic of said display of said plurality of dial keys differs from a corresponding characteristic of said plurality of dial keys in said first mode, said characteristic being at least one of a size, color, and shade of said plurality of dial keys.

* * * * *